Patented Apr. 16, 1940

2,197,711

UNITED STATES PATENT OFFICE 2,197,711

POLYMERIZED ACYLATED COUMARONES

Anderson W. Ralston, Robert J. Vander Wal, and Ervin W. Segebrecht, Chicago, Ill., assignors to Armour and Company, Chicago, Ill., a corporation of Illinois No Drawing. Application September 2, 1938
Serial No. 228,261

8 Claims. (Cl. 260—81)

This invention relates to acylated coumarones and polymerization products thereof, and it comprises as new compositions of matter products prepared by the reaction between coumarones and fatty acid chlorides containing at least twelve carbon atoms in the presence of metallic chlorides.

Among the resins now prepared commercially one of the most important types is that prepared from coumarone or coumarone polymers. These resins can be prepared from coumarone or coumarone fractions by the heat polymerization of coumarone in the presence of certain catalysts. An article by Carmody, Sheehan and Kelly, Ind. Eng. Chem. 30, 24–51 (1938), describes the preparation of resins by the heat polymerization of coumarone-containing materials. Resins prepared from coumarone possess a number of important properties and are of exceptional interest because of the availability and cheapness of coumarone-containing materials. Coumarone resins are usually rather dark in color and when hard tend to be rather brittle and a substantial improvement in their physical properties is desirable.

We have discovered a new type of synthetic resins which can be prepared by the action of fatty acid chlorides having twelve or more carbon atoms upon the coumarones in the presence of metallic chlorides, such as aluminum chloride. The products so prepared have properties quite different from those prepared from coumarone itself. By this method it is possible to prepare a number of synthetic resins having different physical properties which are dependent upon the nature and proportions of the particular fatty acid employed and also the conditions used in their preparation. They vary from highly viscous liquids having drying properties to hard solids.

We have further discovered that these resins have a number of uses, such as in the insulation of wires, as di-electrics, as constituents of varnishes, as protective layers for metals, in various compositions for the ornamentation or protection of wooden surfaces, as molding resins and in the general plastic field.

As stated above, these products are made by the reaction of coumarones with fatty acid chlorides containing twelve or more carbon atoms in the presence of metallic chlorides. Our final products are obtained by hydrolyzing the metallic complexes which are first obtained. In this respect our process is similar to the usual Friedel-Crafts reaction. All of the final products are free of the metal used in the condensation. Under the conditions or preparation of our products the coumarones are simultaneously polymerized and acylated since the compounds catalyzing the acylation also catalyze the polymerization of the coumarones.

The following examples illustrate the general preparation and properties of these products:

Example 1

Twenty grams of aluminum chloride are suspended in 50 cc. of tetrachloroethane in a three-necked flask equipped with a stirrer, dropping funnel and thermometer. To this is added, rapidly, ten grams of stearyl chloride, the temperature being held below 30° C. during the addition. 30 grams of a coumarone solution containing 39% of coumarone is dissolved in 25 cc. of tetrachloroethane. This is added over a period of three hours at a temperature of from 20° C. to 30° C. The temperature is then maintained at 45° C. to 50° C. for about one hour. The reaction mixture comprising an aluminum chloride complex is then decomposed on ice and the solvents removed by steam distillation. The product is dissolved in ether and the ether solution dried with anhydrous sodium sulfate. The ether is then removed by distillation under a vacuum. The product is a soft resinous solid which hardens upon heating to a hard, glossy plastic.

Example 2

11.8 grams of a hard coumarone resin are dissolved in 75 cc. of tetrachloroethane and the solution placed in a three-necked flask equipped with a stirrer and thermometer. 20 grams of linoleyl chloride are added, rapidly, to the solution. The solution is then cooled to 20° C. and 20 grams of aluminum chloride added over a period of one-half hour at 20° C. to 30° C. After the addition of the aluminum chloride the reaction mixture is allowed to remain at room temperature for thirty minutes and then heated at 47° C. to 50° C. for one hour. The product is then hydrolyzed by pouring over ice and the solvent steam distilled. The product is then extracted with ether, the ether solution washed with water to remove mineral acids and dried with anhydrous sodium sulfate. The ether is removed by distillation. The product is a soft resin which hardens only slightly on heating.

Example 3

Twenty grams of aluminum chloride suspended in 50 cc. of tetrachloroethane, 3 grams of oleyl chloride in 25 cc. of tetrachloroethane and 30 grams of 39% solution of coumarone together with 25 cc. of tetrachloroethane are treated as described under Example 1. The product is a syrupy liquid which upon heating sets to a transparent, hard, glossy resin. The product also shows excellent drying properties in air. Its use as a varnish or lacquer base is indicated.

*Example 4*

Twenty grams of aluminum chloride suspended in 50 cc. of tetrachloroethane, 10 grams of linolenyl chloride in 25 cc. of tetrachloroethane and 30 grams of the coumarone solution in 25 cc. of tetrachloroethane are reacted as described under Example 1. The product is a sticky, semisolid which sets to a hard glossy solid on heating. It dries in air to a tough, flexible film.

*Example 5*

Twenty grams of aluminum chloride suspended in 50 cc. of tetrachloroethane, 22 grams of lauryl chloride and 30 grams of the coumarone solution are treated as described under Example 1. The product is a hard resin.

*Example 6*

Twenty grams of aluminum chloride suspended in 50 cc. of tetrachloroethane, 11.8 grams of coumarone dissolved in 25 cc. of tetrachloroethane and 30 grams of linolenyl chloride are reacted as described under Example 2. The product is a semi-solid which hardens to a hard, flexible resin when heated.

*Example 7*

Twenty grams of aluminum chloride suspended in 50 cc. of tetrachloroethane, 30 grams of the coumarone solution and 20 grams of the acid chlorides of lard fatty acids are reacted as described under Example 1. The product is a hard, flexible resin.

All of the above described resins differ from those obtained by the heat polymerization of the coumarones themselves. Their physical properties differ according to the particular fatty acid employed and also vary with the proportion of fatty acid chloride to coumarone which is used. Those prepared from unsaturated fatty acid chlorides have marked drying properties both in air and when heated. They can, for example, be baked upon metal surfaces to give a tough, flexible film which can only be removed with difficulty. These resins are formed by the simultaneous polymerization and acylation of the coumarones, the hydrogen chloride liberated during the reaction serving as a polymerization catalyst. In some cases we can use as one of the starting materials a previously polymerized coumarone but under these conditions our products are not as satisfactory as when the unpolymerized coumarone solution is employed.

We wish to clearly distinguish this invention from those describing the preparation of resins from coumarone, which resins may be plasticized by the addition of ketones or like materials. In this invention the plastic, resinous and drying properties of the products are due to their chemical nature and not to the addition of other compounds.

While our description has been limited to the use of a few specific fatty acid chlorides, it is, of course, evident that any fatty acid chloride containing at least twelve carbon atoms in the molecule would be usable. Thus fatty acid chlorides, such as lauryl, myristyl, palmityl, stearyl, oleyl, linoleyl and linolenyl chlorides, or mixtures of the same could be used. Fatty acid chlorides made from fatty acids prepared by the oxidation of paraffin wax or other hydrocarbons can also be used. These products have been obtained by a typical Friedel-Crafts reaction, that is, a substantially molecular proportion of metallic chloride to fatty acid chloride must be employed and this should be removed by hydrolysis. In the appended claims when we refer to coumarone we mean either coumarone or polymerization products thereof, such as the dimer, trimer or tetramer, etc., wherein coumarone is the essential polymerizing component.

As stated, our products are made by the use of aluminum chloride or other Friedel-Crafts catalyst. An intermediate metallic complex, such as an aluminum chloride complex, first forms. This is hydrolyzed or decomposed on ice to free it of aluminum chloride and the catalyst-free product isolated.

When we refer to coumarone solutions as in Example 1 we mean solutions of coumarone in tetrachloroethane or other organic solvent which is inert in the Friedel-Crafts synthesis.

Having thus described our invention, what we claim is:

1. The process which comprises reacting a coumarone with a fatty acid chloride having at least twelve carbon atoms in the presence of a Friedel-Crafts catalyst, hydrolyzing the intermediate reaction product and recovering a final reaction product.

2. The process as in claim 1 wherein the fatty acid chloride is stearyl chloride.

3. The process as in claim 1 wherein the fatty acid chloride is oleyl chloride.

4. The process as in claim 1 wherein the fatty acid chloride is linoleyl chloride.

5. The product of reacting a coumarone with a fatty acid chloride having at least twelve carbon atoms, in the presence of a Friedel-Crafts catalyst, hydrolyzing the resulting intermediate catalyst-containing reaction product, and recovering a catalyst-free, resinous, final reaction product.

6. The product of reaction a coumarone with stearyl chloride, in the presence of a Friedel-Crafts catalyst, hydrolyzing the resulting intermediate catalyst-containing reaction product, and recovering a catalyst-free, resinous, final reaction product.

7. The product of reacting a coumarone with oleyl chloride, in the presence of a Friedel-Crafts catalyst, hydrolyzing the resulting intermediate catalyst-containing reaction product, and recovering a catalyst-free, resinous, final reaction product.

8. The product of reacting a coumarone with linoleyl chloride, in the presence of a Friedel-Crafts catalyst, hydrolyzing the resulting intermediate catalyst-containing reaction product, and recovering a catalyst-free, resinous, final reaction product.

ANDERSON W. RALSTON.
ROBERT J. VANDER WAL.
ERVIN W. SEGEBRECHT.